Patented Jan. 27, 1953

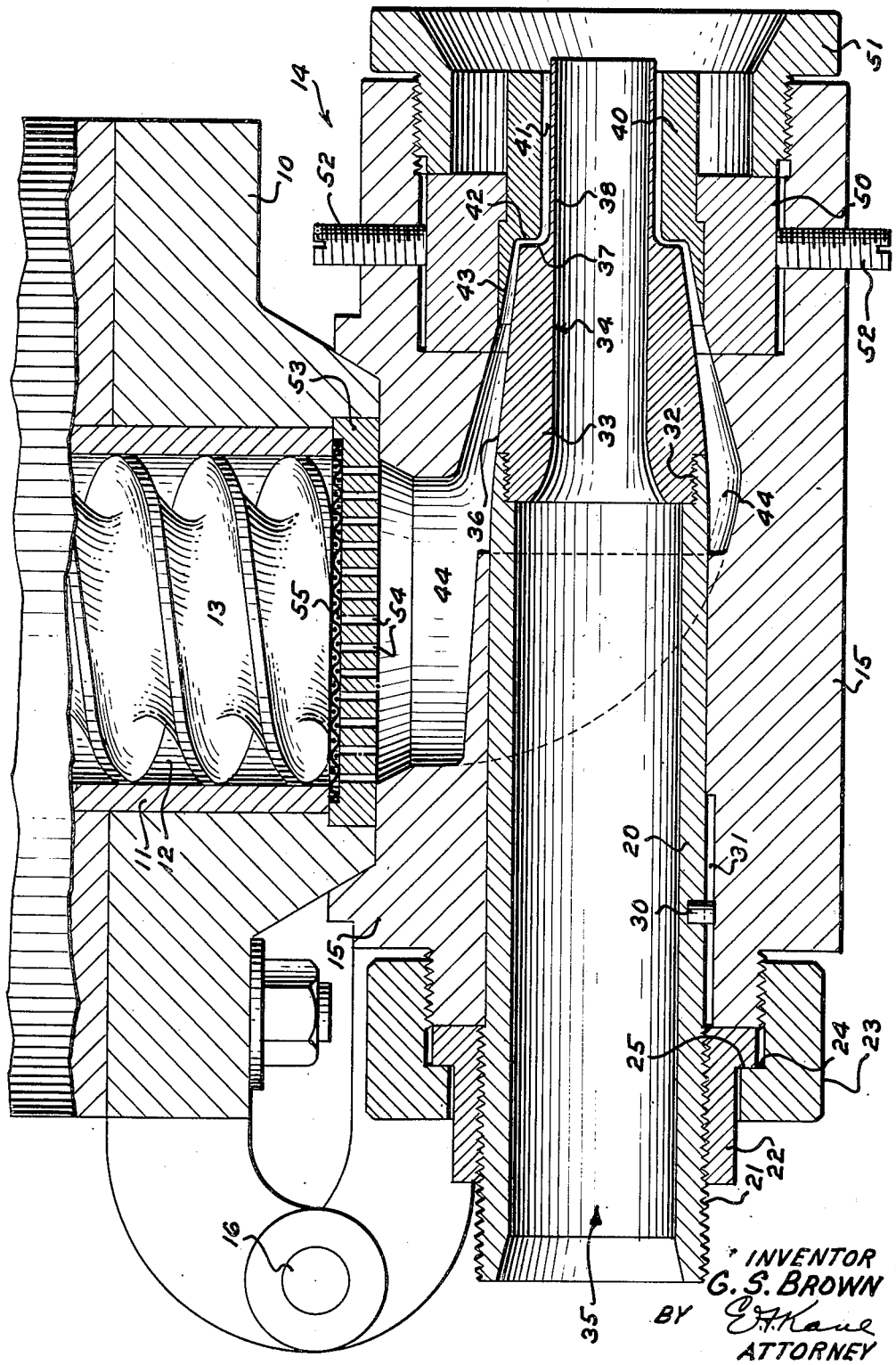

2,626,427

UNITED STATES PATENT OFFICE 2,626,427

APPARATUS FOR CONTROLLING THE PLASTICITY OF EXTRUDABLE MATERIALS IN AN EXTRUDING APPARATUS

Grant S. Brown, Downers Grove, Ill., assignor to Western Electric Company, Incorporated, New York, N. Y., a corporation of New York Application January 31, 1950, Serial No. 141,540

5 Claims. (Cl. 18—13)

1

This invention relates to extruding apparatus and more particularly to cooperating core tube and die assemblies for use in extruding thermoplastic materials on continuously moving cores.

In the manufacture of electrically conducting cables and the like, wherein it is desired to cover a core consisting of one or more cable conductors with a protective or insulating covering of thermoplastic material by extrusion processes, it is necessary that the thermoplastic material be worked prior to extrusion. It is further necessary that the extrudable material be maintained at all times free of air bubbles in order to prevent blisters or other undesirable flaws in the finished covering. It is known in the art to provide a feed screw for simultaneously working and feeding such thermoplastic material into an extruding cavity, and it is further known to provide a breaker plate between the feed screw and the extruding cavity. The breaker plate is preceded by one or more mesh screens and the combined function of the breaker plate and screens is to restrict the flow of the worked plastic material to such an extent that a back pressure is set up in the material being worked and fed by the feed screw. This back pressure is controlled by the number of screens employed and by the mesh of the screens, and the function of the breaker plate is primarily to support the screen or screens. Back pressure is highly desirable in the extrusion of most plastic materials since such pressure tends not only to drive out undesirable entrapped air or other gases, but also tends to increase the temperature of the plastic material to a certain extent, thereby affording more efficient and easier extrusion thereof. It has been found, however, that due to the high fluidity of some plastic materials, it is difficult to obtain the necessary back pressure by the use of ordinary screen and breaker plate combinations.

An object of this invention is to provide a simple and positive means for providing back pressure without reliance on a breaker plate for creating the back pressure.

One embodiment of the invention may comprise a core tube and die assembly so formed that the die is telescopingly positioned over the core tube to provide for extruding a cover on a core passing through the core tube as the core leaves the tube. The die and core tube have formed thereon annular flat faces, the surfaces of which are substantially perpendicular to the axes of the tube and die, thereby defining an annular orifice, the area of which may be varied by axial movement of the tube with respect to the die. Since

2 it is desirable to maintain the thickness of the cover constant, the space between the die and core tube should be of a constant dimension for a substantial distance before the cover is actually deposited on the core. This invention provides for such a requirement since the area occupied by the plastic material after passing through the orifice is not changed by axial movement of the tube with respect to the die. Thus it will be seen that the back pressure on the plastic material around the feed screw may be positively controlled by the simple expedient of varying slightly the axial position of the core tube with respect to the die, and it is further obvious that such variation will have no effect whatsoever on the size of the cover being formed.

Other objects and advantages of the invention will appear from a consideration of the following description taken in conjunction with the accompanying drawing, wherein the single figure drawing illustrates one embodiment of the invention.

Referring to the drawing, the extruding mechanism consists of a cylinder 10 having a cylindrical liner 11 suitably positioned therein to provide a bore 12 into which extrudable plastic material may be fed by any suitable means (not shown). The diameter of the bore 12 is substantially equal to the major diameter of the threads on a feed screw 13 which is rotatably mounted within the bore 12 to work the plastic material and feed it into an extruding head 14.

The extruding head 14 consists of a housing 15 which is suitably hinged to the cylinder 10 by a hinge 16. The housing 15 on the extruding head 14 has a centrally located bore extending therethrough which serves to position a cylindrical core tube holder 20. The core tube holder 20 is suitably threaded on its outer (left) end 21 to receive an adjusting nut 22 which serves to position the core tube holder 20 longitudinally within the bore formed in the housing 15. The adjusting nut 22 is adapted to be locked in position by a locking nut 23 having an inwardly extending annular shoulder 24 formed thereon, which shoulder is adapted to engage an outwardly extending annular shoulder 25 on the adjusting nut 22. The locking nut 23 is suitably threaded so that it threadedly engages cooperating threads formed on the housing 15 whereby tightening of the locking nut 23 causes the adjusting nut 22 to be firmly seated against the housing 15 and thereby prevent axial movement of the core tube holder 20. A key 30, which is formed integral with the core tube holder 20, rides in a longitudinal keyway 31 formed in the housing 15, and consequently rotation of the adjusting nut 22, when the locking nut 23 is released, causes the core tube holder 20 to be moved longitudinally with respect to the housing 15 without relative rotation between the core tube holder 20 and the housing 15.

The core tube holder 20 is interiorly threaded at its inner (right) end with threads 32 which threadedly engage a core tube 33 having a bore 34 in axial communication with a somewhat larger bore 35 in the core tube holder 20. The core tube 33 consists of a frusto-conical portion 36, the smaller diameter of which terminates in an annular flat face 37, the surface of which is substantially perpendicular to the axis of the bore 34. The core tube 33 further consists of an elongated cylindrical portion 38 of reduced outer diameter, which portion extends axially from the face 37.

A die 40 having a cylindrical bore 41 is suitably secured in telescoping relationship with the elongated cylindrical portion 38 of the core tube 33. The bore 41 in the die 40 terminates at its inner (left) end in an enlarged annular flat face 42, which face is substantially parallel to the face 37. The die 40 is also provided at its extreme inner (left) end with a sloping interior annular face 43 which cooperates with the frusto-conical portion 36 on the core tube 33 to provide an annular orifice which guides the plastic material from an annular cavity 44 formed in the housing 15. The die 40 is adapted to be secured to the housing 15 by means of cooperating annular shoulders formed on die 40 and on a die holder 50, and the die holder 50 is in turn locked in position by means of a locking nut 51 which is threadedly engaged with the housing 15. The die 40 is adapted to be laterally positioned with respect to the core tube by means of a plurality of set screws 52 which are threaded into the housing 15 so that their inner ends bear against the die holder 50.

A breaker plate 53 may be provided between the bore 12 and the cavity 44, and the breaker plate may have a plurality of orifices 54 formed therein. The breaker plate may also be provided with a screen 55 which is positioned over the orifices 54 to provide for proper straining of the plastic material before it enters the cavity 44.

As has been stated previously, it has been found that quite often it is difficult to obtain sufficient back pressure within the bore 12 by the use of the screen 55 and breaker plate 53 alone. This difficulty was found to be due primarily to the high fluidity of some of the plastic materials which were being extruded. This invention is adapted to eliminate such difficulties by employing the breaker plate and screen combination primarily for straining purposes, and depending upon the size of the annular orifice formed between the faces 37 and 42 to provide the necessary back pressure. It will thus be seen, that by a very slight axial movement of the core tube 33 with respect to the die 40 a relatively large change in back pressure may be effected. A further advantage of the invention resides in the fact that the relative movement of the core tube 33 and die 40 has no appreciable effect upon the thickness of the cover which is extruded, since the space between the bore 41 and the cylindrical extension 38 is never varied, nor is the pressure of the plastic material at the point of extrusion appreciably changed by the variation in size of the orifice. It is further to be observed, that the construction here described provides for a smooth flow of the plastic material from the cavity 44 due to the sloping annular guiding orifice formed by the frusto-conical portion 36 in cooperation with the complementary guiding surfaces formed by the cavity 44, the die holder 50 and the surface 43 on the die 40. Another important advantage of the apparatus resides in the fact that the right end of the core tube is not appreciably changed in position with respect to the die when the size of the annular orifice is adjusted since only a very slight adjustment is ever necessary to effect an appreciable back pressure change.

It is to be understood that this invention is primarily designed for use in extruding a plastic cover upon a continuously advancing core, which core passes through the bores 35 and 34 to the right end of the extruding head 14 as viewed in the drawing, at which point the cover is extruded thereon. It is, of course, possible to employ the basic ideas of the invention in the manufacture of tubing and the like without departing from the scope of the invention.

It is further to be understood that although the invention has been shown and described with the core tube axially adjustable with respect to the die, the invention also contemplates the use of a die relatively adjustable axially with respect to a fixed core tube.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for controlling the plasticity of extrudable thermoplastic materials being extruded on a core comprising an axially adjustable core tube having an annular outwardly extending shoulder thereon, a portion of the surface of which is substantially perpendicular to the axis of said tube, and having an elongated extension of reduced diameter, a die positioned in constant spaced telescoping relationship with said core tube extension and having an annular shoulder formed thereon, a portion of the surface of which is substantially perpendicular to the axis of said die and facing the said perpendicular portion of the core tube, thereby forming an annular orifice in cooperation with said first-mentioned shoulder through which the extrudable materials may pass, and means for adjusting one of the core tube and the die longitudinally with respect to the other to adjust the size of said annular orifice.

2. A core tube and die construction comprising an annular die having an annular face formed thereon, the surface of which is substantially perpendicular to the die axis, a core tube having an annular face formed thereon substantially parallel to and opposite said first-mentioned annular face, and having an elongated extension of reduced diameter telescopingly extending into said die in spaced relation therewith to provide a passageway of constant size when said angular faces are moved relative to each other, means for directing extrudable material into the annular orifice formed by said parallel faces comprising cooperating guide surfaces formed on said die and core tube, and means for adjusting one of the core tube and die longitudinally with respect to the other to adjust the size of the annular orifice.

3. Means for controlling the back pressure of extrudable plastic materials while being fed from a feed hopper to cooperating forming members comprising in combination a first elongated cylindrical member having a cylindrical portion of increased outer diameter and an elongated integral cylindrical extension of reduced diameter, a second cylindrical member having a bore extending over said extension and parallel therewith, an annular shoulder formed by the junction of said cylindrical portion of increased diameter and said extension, said shoulder defining a first flat face substantially perpendicular to the axis of said cylindrical members, a second flat face substantially parallel to and directly opposite said first flat face formed on said second cylindrical member and cooperating with said first face to define an annular restricted passage, and means to vary the relative positions of said faces while maintaining a constant space between the said bore of the second member and the said extension of said first member.

4. In plastic extrusion apparatus wherein extrudable material is plasticized by means of a feed screw working in a hopper and wherein the plasticized material is then extruded on a core, the combination of a tubulating core tube having a long thin-walled tubulating extension and also provided with an external shoulder substantially perpendicular to the longitudinal axis of the core tube at the start of the extension, an extrusion die in spaced telescoping relation with said tubulating extension, said die having an annular face formed facing the shoulder on the core tube to form an annular orifice, cooperating guide surfaces on said die and core tube for directing extrudable material into said orifice, and means for telescopingly adjusting the position of said core tube with respect to said die thereby varying the size of said orifice.

5. Apparatus for controlling the plasticity of extrudable thermoplastic materials being extruded on a core comprising an axially adjustable core tube having an annular outwardly extending shoulder thereon, a portion of the surface of which is substantially perpendicular to the axis of said tube, and having an elongated extension of reduced diameter, a die positioned in constant spaced telescoping relationship with said core tube elongated extension and having an annular shoulder formed thereon, a portion of the surface of which is substantially perpendicular to the axis of said die, thereby forming an annular orifice in cooperation with said first-mentioned shoulder through which the extrudable materials may pass, and cooperating annular guide surfaces formed on said core tube and die for directing the extrudable materials into said annular orifice where back pressure is created.

GRANT S. BROWN.

REFERENCES CITED

The following references are of record in the file of this patent:

UNITED STATES PATENTS

| Number | Name | Date |
|---|---|---|
| 1,419,090 | Williams | June 6, 1922 |
| 1,726,359 | Martell et al. | Aug. 27, 1929 |
| 2,341,731 | MacGregor et al. | Feb. 15, 1944 |
| 2,471,752 | Ingmanson | May 31, 1949 |